United States Patent
Driesen (10) Patent No.: US 8,380,667 B2
(45) Date of Patent: Feb. 19, 2013

(54) SELECTIVELY UPGRADING CLIENTS IN A MULTI-TENANT COMPUTING SYSTEM

(75) Inventor: Volker Driesen, Walldorf (DE)

(73) Assignee: SAP AG, Walldorf (DE)

(*) Notice: Subject to any disclaimer, the term of this patent is extended or adjusted under 35 U.S.C. 154(b) by 167 days.

(21) Appl. No.: 12/854,766

(22) Filed: Aug. 11, 2010

(65) Prior Publication Data

US 2012/0041988 A1    Feb. 16, 2012

(51) Int. Cl.
*G06F 17/30* (2006.01)

(52) U.S. Cl. ........ 707/624; 707/610; 707/611; 707/613; 707/617; 707/618; 707/620; 707/626; 707/634; 707/635; 707/636; 707/637; 707/639; 707/640; 707/661; 707/674

(58) Field of Classification Search .................. 707/610, 707/611, 613, 617, 618, 620, 624, 626, 634, 707/635, 636, 637, 639, 640, 661, 674, 999.204
See application file for complete search history.

(56) References Cited

U.S. PATENT DOCUMENTS

| | | | |
|---|---|---|---|
| 2007/0094302 A1* | 4/2007 | Williamson et al. | 707/103 R |
| 2008/0098048 A1* | 4/2008 | Cao et al. | 707/204 |
| 2010/0138821 A1* | 6/2010 | Driesen et al. | 717/168 |
| 2011/0214115 A1* | 9/2011 | Kuusilinna et al. | 717/171 |

* cited by examiner

*Primary Examiner* — Syling Yen
(74) *Attorney, Agent, or Firm* — Mintz, Levin, Cohn, Ferris, Glovsky and Popeo, P.C.

(57) ABSTRACT

An application server in a multi-tenant computing system is enabled access to a first set of tables and views in a database according to a first schema. The views in the first schema correspond to a table in a second schema. Thereafter, the table in the second schema is modified to add a column. Views of the modified table as defined by the second schema are generated in a third schema so that the third schema defines a second set of tables and views in the database. Subsequently, access by the application server to the second set of tables and views in the database is enabled and access by the application server to the first set of tables and views in the database is prevented. Related apparatus, systems, techniques and articles are also described.

15 Claims, 5 Drawing Sheets

SELECTIVELY UPGRADING CLIENTS IN A MULTI-TENANT COMPUTING SYSTEM

TECHNICAL FIELD

The subject matter described herein relates to selectively upgrading clients in a multi-tenant computing system.

BACKGROUND

Various organizations make use of enterprise resource planning (ERP) software architectures to provide an integrated, computer-based system for management of internal and external resources, such as for example tangible assets, financial resources, materials, customer relationships, and human resources. In general, an ERP software architecture is designed to facilitate the flow of information between business functions inside the boundaries of the organization and manage the connections to outside service providers, stakeholders, and the like. Such architectures often include one or more centralized databases accessible by a core software platform that consolidates business operations, including but not limited to those provided by third party vendors, into a uniform and organization-wide system environment. The core software platform can reside on a centralized server or alternatively be distributed across modular hardware and software units that provide "services" and communicate on a local area network or over a network, such as for example the Internet, a wide area network, a local area network, or the like.

As part of the installation process of the core software platform on computing hardware owned or operated by the organization, one or more customized features, configurations, business processes, or the like may be added to the default, preprogrammed features such that the core software platform is configured for maximum compatibility with the organization's business processes, data, and the like.

The core software platform of an ERP software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. Smaller organizations can also benefit from use of ERP functionality. However, such an organization may lack the necessary hardware resources, IT support, and/or consulting budget necessary to make use of a standalone ERP software architecture product and can in some cases be more effectively served by a software as a service (SaaS) arrangement in which the ERP system architecture is hosted on computing hardware such as servers and data repositories that are maintained remotely from the organization's location and accessed by authorized users at the organization via a thin client, such as for example a web browser, over a network.

In a software delivery configuration in which services provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Such an approach can introduce several challenges. As one example, with a multi-tenant approach, lifecycle events such as an application server going down synchronously affect customers using the system. In addition, for convention upgrade procedures, downtime is required which in turn requires that all customers have a simultaneous downtime. Such an arrangement is not always suitable for all customers, especially when they are geographically dispersed across multiple time zones (e.g., Saturday night in Europe is daytime in USA or Asia, and Sunday is a working day in the Middle East, etc.). Therefore, to avoid such issues, dedicated systems are needed per region, which increases costs. Moreover, even if such customers are in the same time zone, negotiations might have to occur amongst multiple customers when the downtime will be extensive. Such a scenario can quickly become complicated when there are multiple parties each with differing agendas.

For certain tasks during an upgrade, the runtime depends on the data volume, the number of entries in the tables. Thus for larger systems, downtime becomes larger. In a multi tenant system, not only one customer enters data, but several (e.g. up to 100) so that the data volume is larger than the volume of a single customer system. To a certain extent, the larger volume can be processed with stronger hardware and more processes. However, such hardware and processes can be costly.

SUMMARY

In one aspect, an application server in a multi-tenant computing system is enabled access to a first set of tables and views in a database according to a first schema. The views in the first schema correspond to a table in a second schema. Thereafter, the table in the second schema is modified to add a column. Views of the modified table as defined by the second schema are generated in a third schema so that the third schema defines a second set of tables and views in the database. Later, access by the application server to the second set of tables and views in the database is enabled and access by the application server to the first set of tables and views in the database is prevented.

The multi-tenant computing system can form part of a multi-tenant environment using a single software delivery architecture. The multi-tenant computing system can include the storage infrastructure, at least one application server accessible over a network from the plurality of clients associated with each of multiple tenants, and at least one data repository. The at least one data repository can contain core software platform content relating to the operation of the multi-tenant computing system which is not modifiable by the multiple tenants, system content including data objects created in runtime by the multi-tenant computing system that are modifiable with data provided by a corresponding tenant, and tenant content including data objects or extensions to data objects that are customized for a corresponding tenant, wherein data objects or extensions to data objects of a particular tenant are not available to other tenants.

The tables according to the first and third schemas can be repository tables. The table according to the second schema can be an application table. The views in the first set of tables and views can be deleted after access by the application server to the second set of tables and views is enabled. The generated views can be provided with data characterizing a structure of the modified table. The generated views can be provided with access permissions such that the third schema is granted access to the contents of tables in the first schema.

In another aspect, a first application server is enabled access to a first set of tables and views in a database according to a first schema. The views in the first schema correspond to a table in a second schema. Thereafter, a structure of the table in the second schema is modified. Views of the modified table as defined by the second schema are generated in a third schema so that the third schema defines a second set of tables and views in the database. A second application server is then enabled access to the second set of tables and views in the database while the first application server is prevented access to the first set of tables and views in the database.

In a further aspect, a method for implementation in a database is provided. The database comprises a first schema and a second schema having application tables. The first schema has first repository tables and first application views of the application tables. A first application server connects to the database using the first schema. The method comprises: generating a third repository schema having second repository tables, modifying a structure of the application tables in the second schema, generating second application views in the third schema to reflect the modified structure of the application tables in the second schema, connecting a second application server to the database using the third schema, disabling access to the database by the first application server, and enabling access to the database by the second application server.

Articles of manufacture are also described that comprise computer executable instructions permanently stored on computer readable media (e.g., non-transitory computer readable media), which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein.

The subject matter described herein provides many advantages. For example, the current techniques allow for the processing of data for one customer at a time. This in turn enables the utilization of available hardware resources for one customer, which has the benefit of faster processing times and shorted customer downtimes. In addition, with the current techniques, if an error occurs during the processing of customer data during downtime, the process only needs to be revered for such customer and not other customers.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
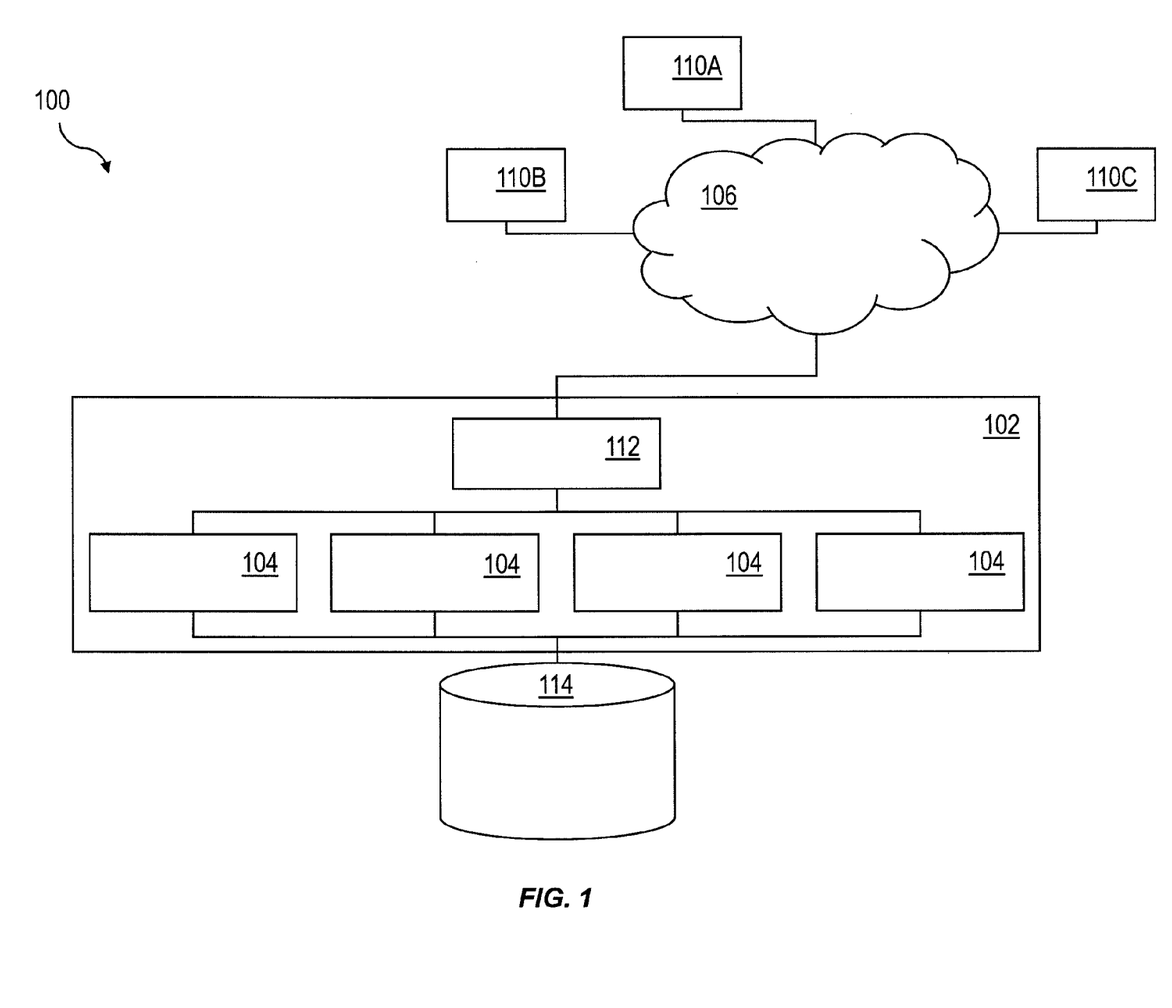
FIG. 1 is a diagram of a multi-tenant computing system.

FIG. 1 shows a block diagram of a multi-tenant implementation of a software delivery architecture 100 that includes an application server 102, which can in some implementations include multiple server systems 104 that are accessible over a network 106 from client machines operated by users at each of multiple organizations 110A-110C (referred to herein as "tenants" (and sometimes "clients") of a multi-tenant computing system) supported by a single software delivery architecture 100. One example of such a software delivery architecture can include features similar to those of the Business ByDesign™ software available from SAP AG (Walldorf, Germany).

For a system in which the application server 102 includes multiple server systems 104, the application server can include a load balancer 112 to distribute requests and actions from users at the one or more organizations 110A-110C to the one or more server systems 104. A user can access the software delivery architecture across the network using a thin client, such as for example a web browser or the like, or other portal software running on a client machine. The application server 102 can access data and data objects stored in one or more data repositories 114.

Figure 2:
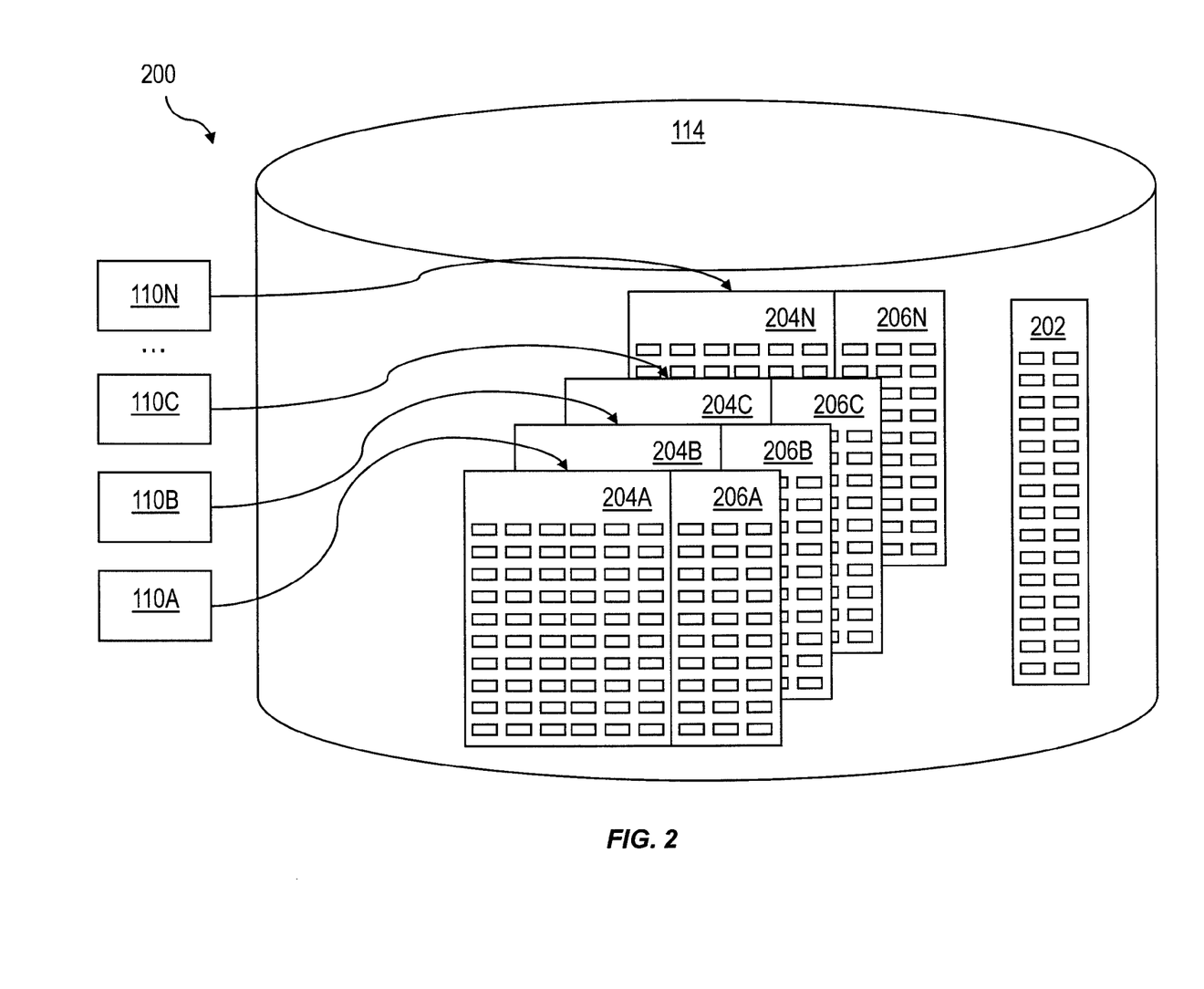
FIG. 2 is a diagram illustrating various types of content stored in the multi-tenant computing system of FIG. 1.

To provide for customization of the core software platform for each of multiple organizations supported by a single software delivery architecture 100, the data and data objects stored in the repository or repositories 114 that are accessed by the application server 102 can include three types of content as shown in FIG. 2: core software platform content 202, system content 204, and tenant content 206. Core software platform content 202 includes content that represents core functionality and is not modifiable by a tenant. System content 204 can in some examples be created by the runtime of the core software platform and can include core data objects that are modifiable with data provided by each tenant. For example, if the core software platform is an enterprise resource planning (ERP) system that includes inventory tracking functionality, the system content 204A-204N can include data objects for labeling and quantifying inventory. The data retained in these data objects are tenant-specific, for example, each tenant 110A-110N stores information about its own inventory. The system content 204A-204N can be stored in client (i.e., tenant) independent tables that comprise tables which hold shipped software, shipped content and default configuration information.

Tenant content 206A-206N includes data objects or extensions to other data objects that are customized for one specific tenant 110A-110N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 206 can include condition records in generated condition tables, access sequences, price calculation results, or any other tenant-specific values.

The tenant content 206 can be stored in client dependent tables that can contain customer content and customer configuration are created with a key field "client" (i.e., the user administration is client dependent, business data is client dependent, business configuration, runtime data, log information, etc.). For the client independent tables, content can be stored according to two mechanism namespace and a second table. With the namespace, a customer can write data to the client independent tables where the entries are separated by a namespace in one existing key-field: the "name" field at SAP applications. For example, a customer entry named "cust-extension" is stored with the name "/<client-nr>/cust-extension" where the client-nr is the namespace. The read-write access of a client to client independent entries is limited to the namespace of the client (read also the entries w/o namespace). The second table can have a client key-field so that for tables where customers shall be able to store own entries a second table is created with the same structure, but an additional first key field "client". For access to this table, the access rules of application tables also apply.

A combination of the software platform content 202 and system content 204 and tenant content 206 of a specific tenant are presented to users from that tenant such that each tenant is provided access to a customized solution having data that is available only to users from that tenant.

Figure 3:
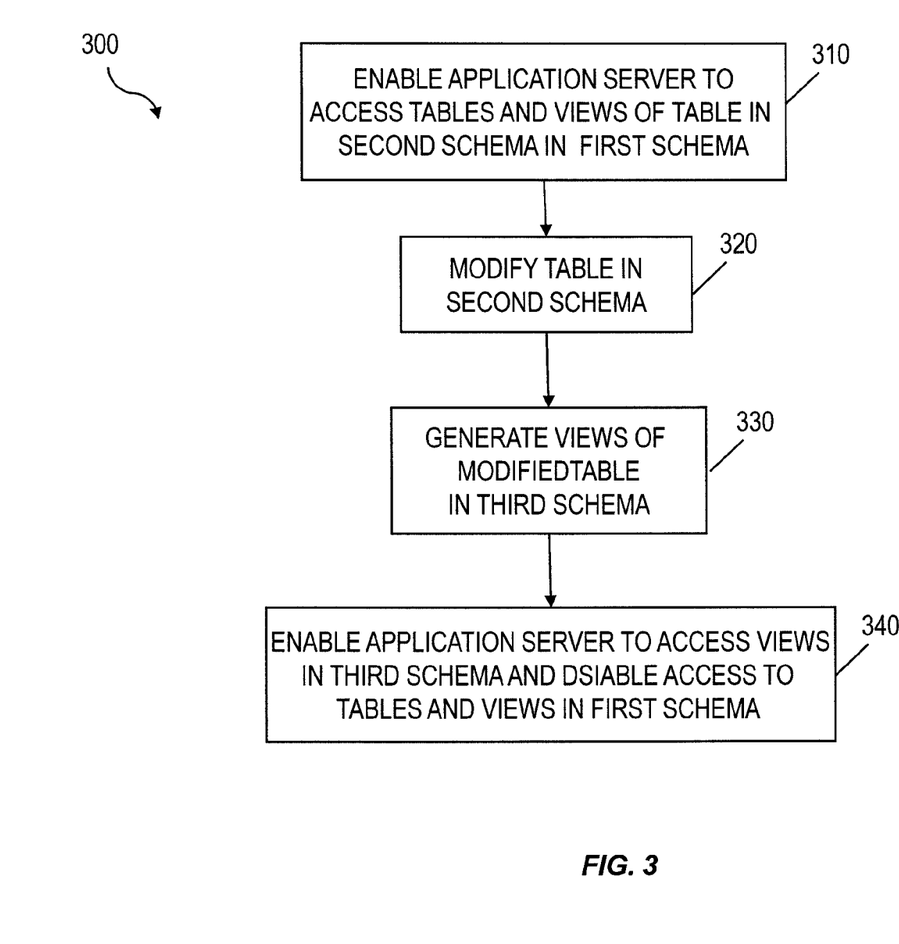
FIG. 3 is a diagram illustrating a process flow diagram for selectively upgrading a client in a multi-tenant computing system.

FIG. 3 is a diagram illustrating a method 300 in which, at 310, an application server in a multi-tenant computing system is enabled access to a first set of tables and views in a database according to a first schema. The views in the first schema correspond to a table in a second schema. Thereafter, at 320, the table in the second schema is modified to add a column. Views of the modified table as defined by the second schema are, at 330, generated in a third schema so that the third schema defines a second set of tables and views in the database. Subsequently, at 340, access by the application server to the second set of tables and views in the database is enabled and access by the application server to the first set of tables and views in the database is prevented.

Figure 4:
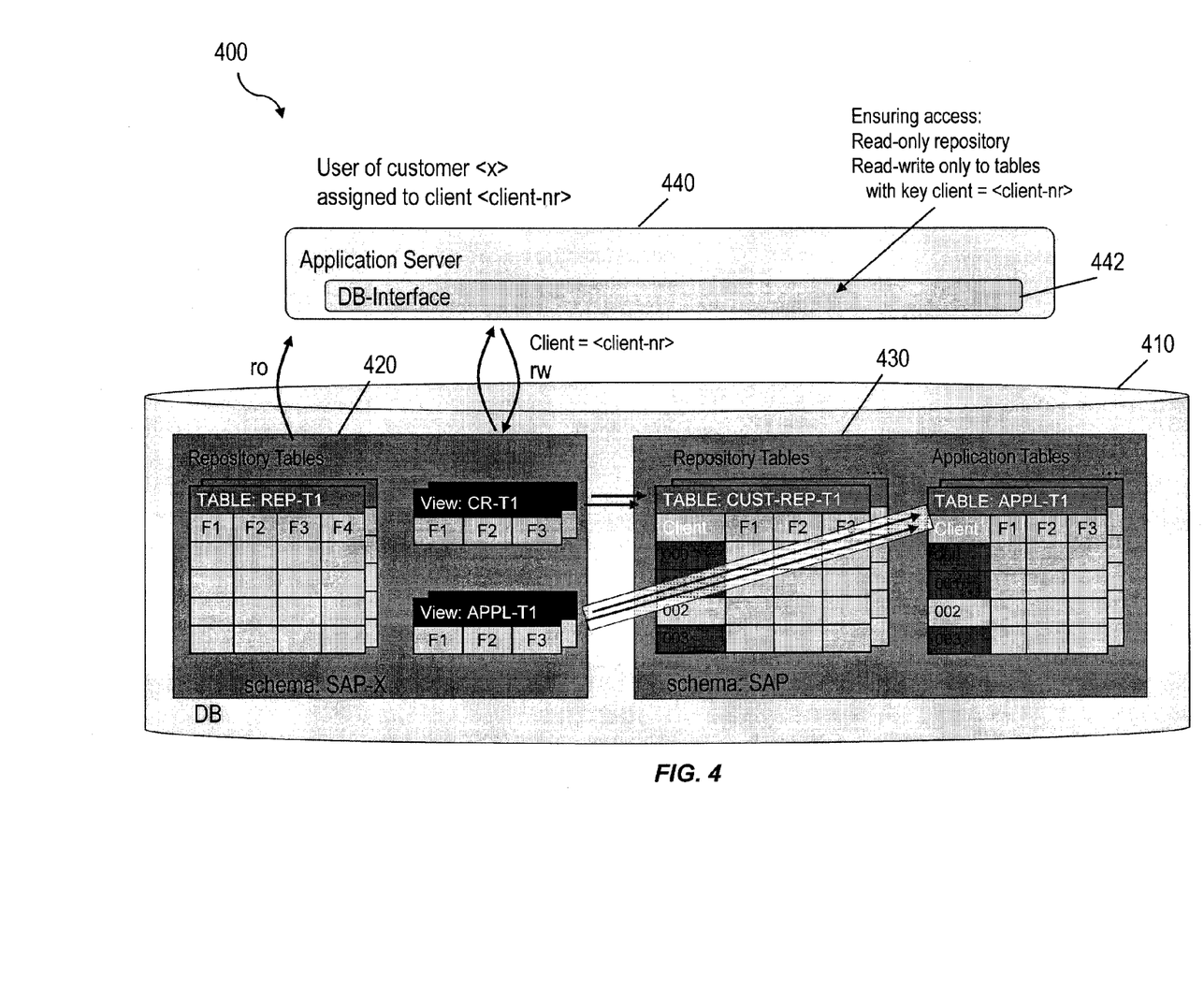
FIG. 4 is a diagram illustrating a database with two schemas.

FIG. 4 is a diagram 400 illustrating a database 410 that allows for the creation of objects with the same name in different schemas 420, 430. Access rights can be restricted for users such that they can have access to only one schema 420, 430. Upon access to the database 410 by a database interface 442 of a first application server 440, the schema 420, 430 needs to be specified. Either this happens upon connection to the database 410 such that always one schema 420, 430 is used or the schema 420, 430 is specified upon each access. For example, "select * from SAP-X.REP-T1" gives the result of all entries of table REP-T1 residing in schema SAP-X 420. "select * from SAP.CUST-REP-T1" gives the result of all entries of table CUST-REP-T1 residing in schema SAP 430.

If upon logon to the database, the schema 420, 430 is defined (e.g. SAP), only the table (or view) name needs to be specified for access: Logged on to schema SAP-X 420 allows writing the select as: "select * from REP-T1". The access to the content of another schema can be provided by creating a database view in schema SAP-X 420 which selects the entries from a table in schema SAP 430 "create view CR-T1 as select * from SAP.CUST-REP-T1". Additional permissions have to be granted to enable the access and change of content in another schema 420, 430.

This way, the first application server 440 only needs to specify the schema 420, 430 for the connect and afterwards all other access can happen through select and updates without the need to specify the schema 420, 430 (i.e., the schema name does not need to be known in each application writing a select, but only in the configuration of the application server 440). In this example, it can be assumed that there is no difference in the behavior for CUST-REP-T1 and APPL-T1, so the CUST-REP-T1 is no longer specified explicitly.

Figure 5:
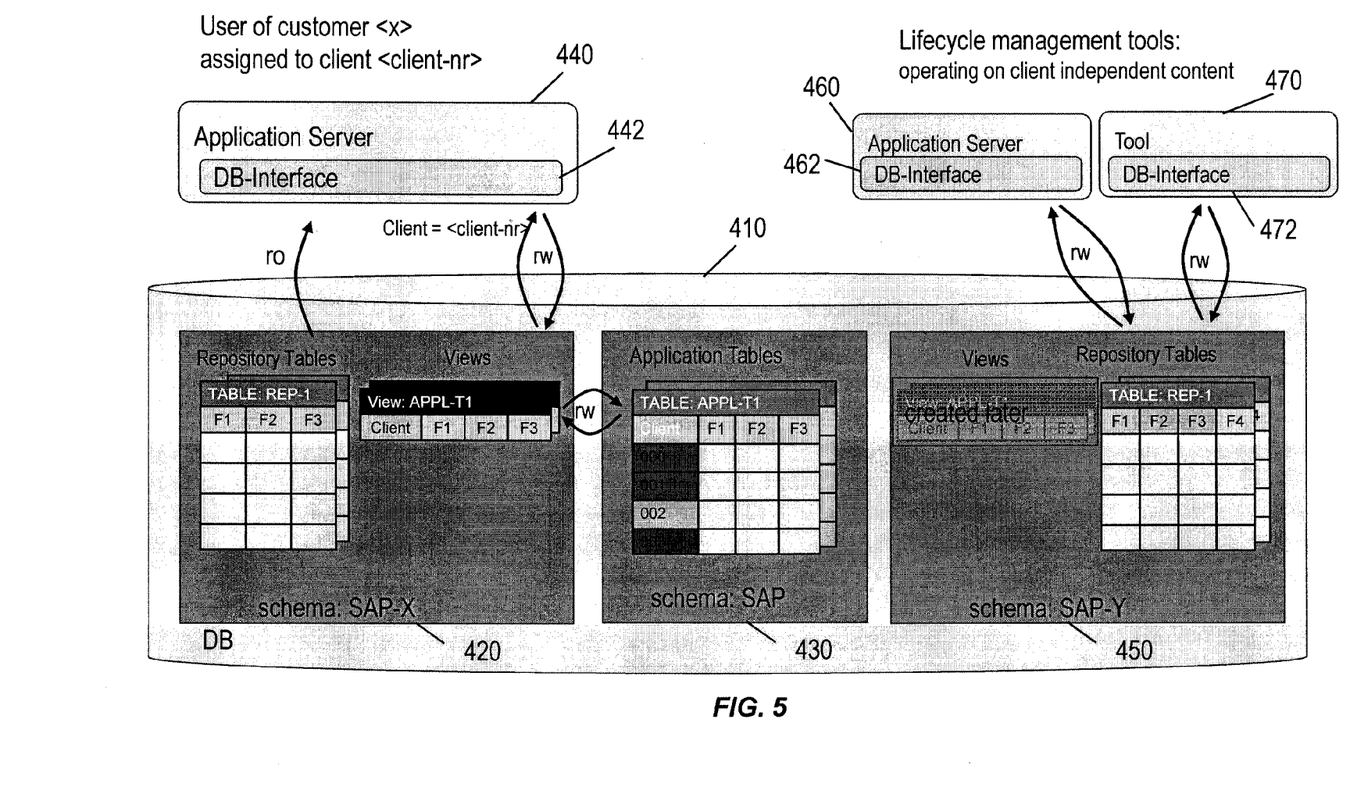
FIG. 5 is a process flow diagram illustrating the database of FIG. 4 after it has been upgraded to include a new schema.

With reference to the diagram 500 of FIG. 5, the database 410 for all clients can be updated using a shadow repository. This approach for the creation of another schema SAP-Y 450 where repository tables can be created for a new release and populated with the delivered content. This can be done in parallel to the productive use of schemas SAP-X 420 and SAP 430.

Lifecycle management (LM) tools 470 which can be stand-alone software can use the same database interface code which allows for specifying the schema 420, 430, 450 to connect to the database 410 as a second application server 460. LM tools 470 can be stand-alone (and have a separate database interface 472) or they can run within the second application server 460. For the LM tools 470, write access to the client independent tables needs to be provided.

Thereafter, downtime begins such that users may not use the system, no B2B, no batch jobs, and the like. The application tables in schema SAP 430 are adjusted to a new structure (e.g., add a field, delete a field, etc). Views can be created in schema SAP-Y 450 to make access to the application tables available in schema SAP-Y 450. Content within the tables can be adjusted if required (by a program modifying the content according to the requirements of the new software version). This can be a program running in the second application server 460 connected to schema SAP-Y 450 (it can be appreciated that the first and second application servers 440, 460 can comprise a single application server or a plurality of application servers). The views in SAP-X 420 can be deleted. The second application server 460 can then be started with the configuration to now use schema SAP-Y 450. Thereafter, the downtime can end. In this manner, the repository can be upgraded in uptime and so down time can be greatly reduced. However, there can still be downtime for all tenants and such downtime can be longer because all content in the application tables has to be processed. Notwithstanding, this arrangement is advantageous it allows a client-by-client upgrade as described below.

The current subject matter enables a client-by-client upgrade in arrangements in which all clients use the same tables, but only different rows—according to the client field. A client-by-client upgrade creates a new schema (SAP-Y 450) and associates DB tables and imports the repository in a manner similar to that described above.

With a client-by-client upgrade, application tables are changed according to the new structure (schema SAP 430). There are requirements and limitations which can arise out of this change. For example, changing the structures can occur at uptime such that no access to the database 410 is possible for a limited period of time. The downtime can be very short (ideally not noticeably by the user)—so the Data Definition Language (DDL) statement to change the table structure must work fast. This limits the changes allowed to be shipped in a new version to changes the utilized database 410 supports (e.g. add a field). In addition, field type changes may not be possible, field deletions may require a more complex process (ideally also not allowed), the database must support that the view selecting content from the tables is not corrupted by changing the table (otherwise, the view does also need to be re-created, which makes the downtime longer). Moreover, the old application still gets structures upon a select, which match the software version, the view (i.e. APPL-T1) is not changed and still returns only the "old" known fields. New fields are not selected by the old views.

After the application tables are changed according to the new structure (schema SAP 430), new views are created (schema SAP-Y 450). The new views get the new structure and access permissions are granted to the schema SAP-Y 450 to enable access of the content of tables in schema SAP 430.

The following can be executed for each client independently (i.e., the operations can be repeated for all clients, etc.).

Once all clients are using the new software, the old repository, old view and old schema (SAP-X 420) can be deleted.

For each client, downtime begins (e.g., no users for this client are allowed to log in, no B2B for this client, no batch jobs for this client). The first application server 460 is configured to reject logon to the respective client, the DB interface 462 rejects read-write to the respective table entries (client=<client-nr>). The second application server 460 via its DB interface 462 is configured to accept logon to the respective client. The application programs are called to migrate the data in the application tables to match the new structure only for the client under upgrade (client=<client-nr>). Thereafter, downtime ends for the client. The customer assigned to client=<client-nr> is then enabled to access the second application server 460.

The client-by-client upgrade functionality can require different software than other multi-tenant computing systems. For example, a LM procedure extension module (global part) can be required. Such LM procedure extension module can (i) execute DDL statements with a user having permission to change tables in all three schema 420, 430, 450 DDL statement having fully qualified names, (ii) update persistency to change DB schema 420, 430, 450 access for the second application server 460, (iii) update persistency to change client access status for the second application server 460, and/or (iv) call a DDL generator to create DDL statements for all tables in one schema 420, 430, 450, create DDL statements for all views in one schema 420, 430, 450, create grant/revoke statements and subsets of statements for tables and views where the table changed in a new version of the software.

An LM procedure extension module (client specific part) can be required that can (i) set a client to "no access allowed" and terminate all user sessions of users having logged in with this client, and/or (ii) call a client specific application migration module. A DB interfaces extension module can allow or reject DB access to a table's rows where the client value is according to a value in the client status persistency. A user management extension module can allow or reject user login to a client according to the values defined in the client status persistency. A DDL generator module can (i) generate DDL statements (data definition language, describing table create or change statements, etc.), (ii) generate statements including the DB schema name, to allow changing also tables of different schema (e.g. change tables in SAP 430 and SAP-X 420), (iii) generate statements for views enabling the access to table T residing in schema SAP 430 to users having access to schema SAP-X 420, and/or (iv) generate statements to grant (and revoke) access for tables residing in schema SAP 430 to schema SAP-X 420 (or schema SAP-Y 450). In addition, a required persistency module can be required which can (i) store, how the schema is called (SAP-X 420 or SAP-Y 450, SAP 430), (ii) store, which client is allowed to login and access the database 410, (iii) store, which table is of category "repository", which has a client field and is of category "application", and/or (iv) store mapping information to specify which table resides in which schema 420, 430, 450.

Depending on the multi-tenant architecture and implementation, certain limitations and requirements may exist. For example, content may need to be separated by being shipped in its own tables (REP-x). Shipment to client dependent tables can be restricted. Application data migration programs can operate for only a single client.

In addition, requirements to the changes in a new version can be required. For example, the system may required that new application tables and fields are allowed while at the same time preventing field type changes and table and field deletions (however such deletions can be enabled with a more complex procedure).

In addition, the database 410 can be configured such that a DDL statement (add field) can be executed within a very short period of time (<1 s), while users can access the view pointing to the table. The database 410 can also be configured such that a DB view can be created accessing a table residing in another schema 420, 430, 450. In addition, the database 410 can be configured such that views do not have to be re-created, if the table changes the view that is pointed to. Moreover, the database 410 can be configured to allow a schema (or other approach) to create objects with the same name but with a different structure.

While the foregoing has been directed to situations in which one or more columns are added to an application table, the current subject matter can also be used when a column is to be deleted with some variations. In these cases, the application table structure can be maintained during the duration of the upgrade. A second view can be added without the field to be deleted. The tenant-switch-over is then run for all tenants. The first schema is later deleted as are the fields in the application tables which are no longer required.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more, computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, while the descriptions of specific implementations of the current subject matter discuss delivery of enterprise resource planning software to multiple organizations via a multi-tenant computing system, the current subject matter is applicable to other types of software and data services access as well. In addition, the logic flow depicted in the accompanying figures and described herein do not require the particular order shown, or sequential order, to achieve desirable results. Other embodiments may be within the scope of the following claims.

What is claimed is:

1. A computer-implemented method comprising:
enabling, in a multi-tenant computing system, an application server to access a first set of tables and views in a database according to a first schema, each table being associated with one or more corresponding tenants of the multi-tenant computing system, the views in the first schema corresponding to a table in a second schema, the table in the second schema being associated with at least one tenant;
modifying the table in the second schema to add a column, the modifying being performed separately for different tenants such that a software upgrade associated with each tenant occurs during a corresponding separate time period;
generating views of the modified table as defined by the second schema in a third schema so that the third schema defines a second set of tables and views in the database; and
enabling the application server to access the second set of tables and views in the database and preventing access by the application server to the first set of tables and views in the database;
wherein:
the multi-tenant computing system forms part of a multi-tenant environment using a single software delivery architecture,
the separate software upgrade for each tenant allows the software upgrade of a first tenant to occur during a downtime for the first tenant and an uptime for a second tenant,
the multi-tenant computing system comprises:
at least one data repository containing:
core software platform content relating to the operation of the multi-tenant computing system which is not modifiable by the multiple tenants;
system content including data objects created in runtime by the multi-tenant computing system that are modifiable with data provided by a corresponding tenant, and
tenant content including data objects or extensions to data objects that are customized for a corresponding tenant, wherein data objects or extensions to data objects of a particular tenant are not available to other tenants.

2. A method as in claim 1, wherein the tables according to the first and third schemas are repository tables.

3. A method as in claim 2, wherein the table according to the second schema is an application table.

4. A method as in claim 1, wherein the views in the first set of tables and views are deleted after access by the application server to the second set of tables and views is enabled.

5. A method as in claim 1, wherein the generated views are provided with data characterizing a structure of the modified table.

6. A method as in claim 1, wherein the generated views are provided with access permissions such that the third schema is granted access to the contents of tables in the first schema.

7. A method comprising:
enabling, in a multi-tenant computing system, a first application server to access a first set of tables and views in a database according to a first schema, the views in the first schema corresponding to a table in a second schema;
modifying a structure of the table in the second schema, the modifying being performed separately for different tenants of the multi-tenant computing system such that the separate modifying allows an upgrade of a first tenant to occur during a downtime for the first tenant and during an uptime for a second tenant;
generating views of the modified table as defined by the second schema in a third schema so that the third schema defines a second set of tables and views in the database; and
enabling a second application server to access the second set of tables and views in the database and preventing access by the first application server to the first set of tables and views in the database;
wherein:
the multi-tenant computing system forms part of a multi-tenant environment using a single software delivery architecture,
the separate software upgrade for each tenant allows the software upgrade of a first tenant to occur during a downtime for the first tenant and an uptime for a second tenant,
the multi-tenant computing system comprises:
at least one data repository containing:
core software platform content relating to the operation of the multi-tenant computing system which is not modifiable by the multiple tenants;
system content including data objects created in runtime by the multi-tenant computing system that are modifiable with data provided by a corresponding tenant, and
tenant content including data objects or extensions to data objects that are customized for a corresponding tenant, wherein data objects or extensions to data objects of a particular tenant are not available to other tenants.

8. A method as in claim 7, wherein the tables according to the first and third schemas are repository tables.

9. A method as in claim 8, wherein the table according to the second schema is an application table.

10. A method as in claim 7, wherein the views in the first set of tables and views are deleted after access by the second application server to the second set of tables and views is enabled.

11. A method as in claim 7, wherein the generated views are provided with data characterizing a structure of the modified table.

12. A method as in claim 7, wherein the generated views are provided with access permissions such that the third schema is granted access to the contents of tables in the first schema.

13. A method for implementation in a database, the database comprising a first schema and a second schema having application tables, the first schema having first repository tables and first application views of the application tables, a first application server connecting to the database using the first schema, the method comprising:
- generating a third repository schema having second repository tables;
- modifying a structure of the application tables in the second schema, the modifying being performed on a tenant-by-tenant basis such that a software upgrade associated with two or more tenants occurs during a separate time period, the separate software upgrade for each tenant comprising the software upgrade of a first tenant occurring during a downtime for the first tenant and an uptime for a second tenant;
- generating second application views in the third schema to reflect the modified structure of the application tables in the second schema;
- connecting a second application server to the database using the third schema;
- disabling access to the database by the first application server; and
- enabling access to the database by the second application server, wherein:
- the multi-tenant computing system forms part of a multi-tenant environment using a single software delivery architecture,
- the separate software upgrade for each tenant allows the software upgrade of a first tenant to occur during a downtime for the first tenant and an uptime for a second tenant,
- the multi-tenant computing system comprises:
  - at least one data repository containing:
    - core software platform content relating to the operation of the multi-tenant computing system which is not modifiable by the multiple tenants;
    - system content including data objects created in runtime by the multi-tenant computing system that are modifiable with data provided by a corresponding tenant, and
    - tenant content including data objects or extensions to data objects that are customized for a corresponding tenant, wherein data objects or extensions to data objects of a particular tenant are not available to other tenants.

14. A method as in claim 13, further comprising: deleting the first repository tables and the first application view.

15. A method as in claim 13, further comprising: deleting a kernel associated with the first application server.

* * * * *